(12) United States Patent
Hoffmann et al.

(10) Patent No.: US 6,566,776 B2
(45) Date of Patent: May 20, 2003

(54) SPINDLE MOTOR WITH SEALING, FLEXIBLE SUPPORT FILM

(75) Inventors: Jörg Hoffmann, Mettlach (DE); Thilo Rehm, Villingen-Schwenningen (DE)

(73) Assignee: Precision Motors Deutsche Minebea GmbH, Villingen-Schwenningen (DE)

( * ) Notice: Subject to any disclaimer, the term of this patent is extended or adjusted under 35 U.S.C. 154(b) by 88 days.

(21) Appl. No.: 09/813,221

(22) Filed: Mar. 20, 2001

(65) Prior Publication Data

US 2001/0033061 A1 Oct. 25, 2001

(30) Foreign Application Priority Data

Mar. 24, 2000 (DE) .......................... 100 14 825

(51) Int. Cl.⁷ .......................... H02K 11/00; H02K 7/14; H02K 3/00; G11B 17/02
(52) U.S. Cl. .................. 310/91; 360/98.07; 360/99.08; 360/99.04; 310/67 R; 310/68 R; 310/85; 439/67; 439/329; 439/493
(58) Field of Search ................ 310/91, 98.07, 310/68 R, 67 R, 85, 71, 194, 81; 360/99.04, 99.08, 99.07; 439/67, 329, 439

(56) References Cited

U.S. PATENT DOCUMENTS

| 5,672,927 | A  | * | 9/1997 | Viskochil ..................... 310/194 |
| 6,351,042 | B1 | * | 2/2002 | Takayanagi .................. 310/43 |
| 6,417,589 | B1 | * | 7/2002 | Kuyama ....................... 310/81 |
| 6,437,464 | B1 | * | 8/2002 | Neal ............................ 310/43 |

* cited by examiner

*Primary Examiner*—Nestor Ramirez
*Assistant Examiner*—I A Mohandesi
(74) *Attorney, Agent, or Firm*—Baker & Daniels

(57) ABSTRACT

The invention relates to a spindle motor having a sealing support film which prevents exchange of air between the interior and surroundings of the spindle motor. In spindle motors for hard disk drives it is extremely important to construct the spindle motor so that it is sealed tight against the external environment, ie so that from the connecting side of the spindle motor no admission of air to the interior of the spindle motor can occur. A further characteristic of the invention consists in that the support film is bonded and fixed in place in sealing manner by means of an adhesive which does not give off gas or does so only very slightly.

27 Claims, 5 Drawing Sheets

Figure 3:
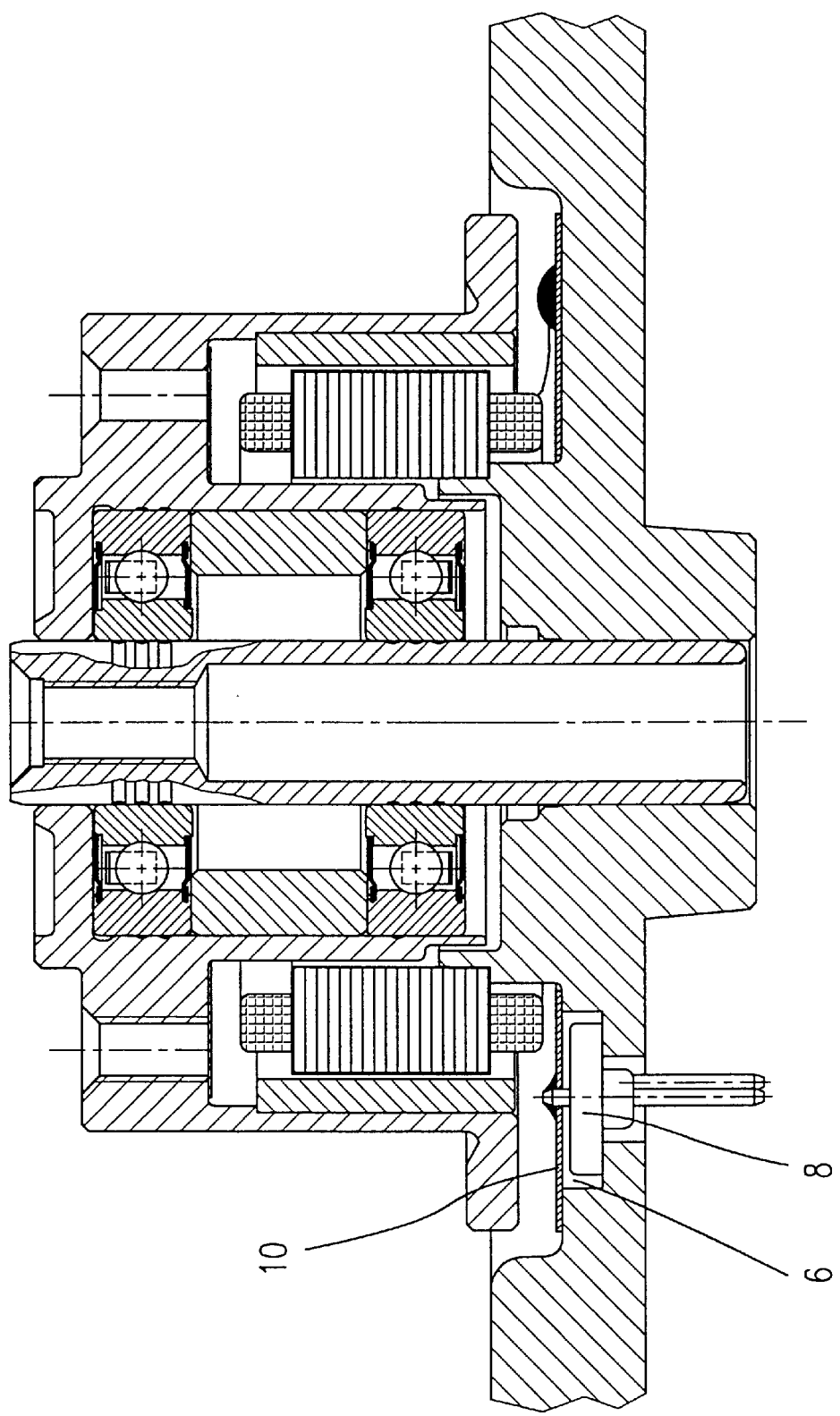

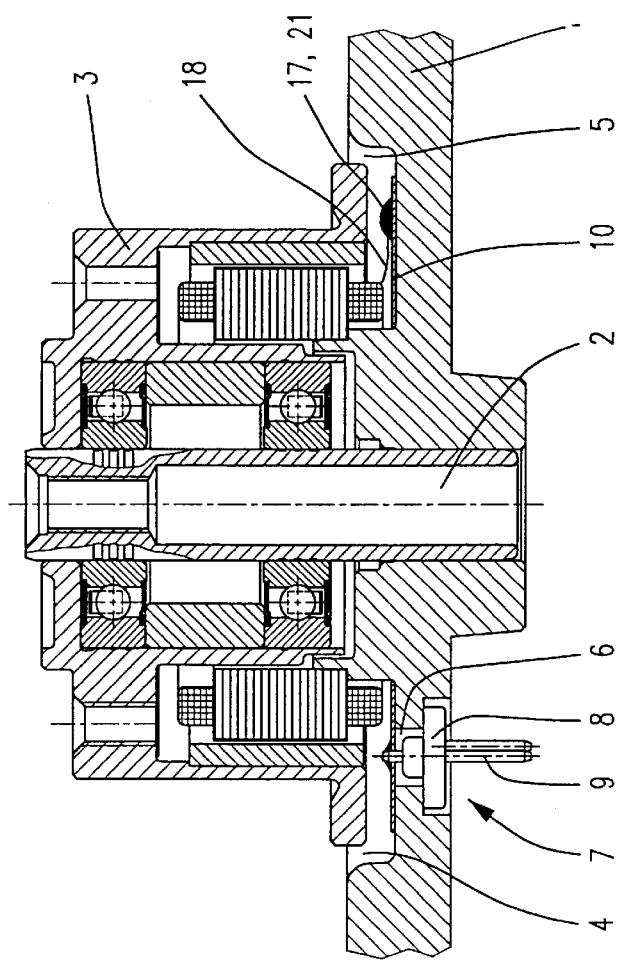
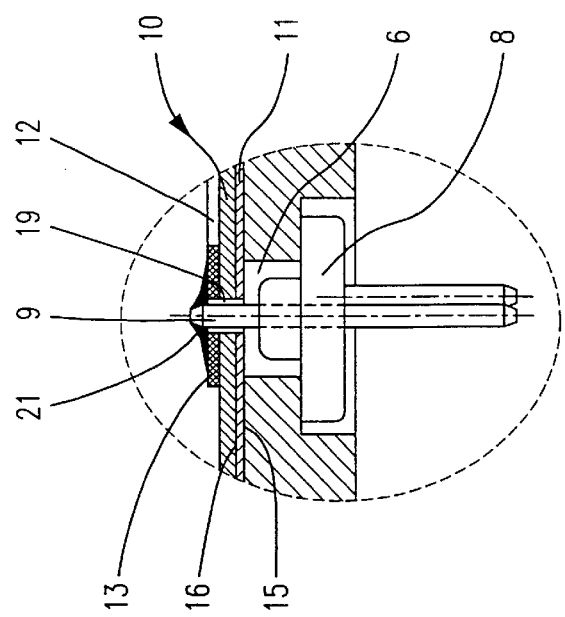

SPINDLE MOTOR WITH SEALING, FLEXIBLE SUPPORT FILM

The invention relates to a spindle motor with a sealing, flexible support film.

It is extremely important to construct spindle motors so that the interior of the spindle is sealed tight against the external environment, ie so that no air can be admitted into the interior of the spindle motor from the connection side of the spindle motor.

In this case the critical point on the spindle motor is the connection side which as a rule consists of connecting pins and establishes the electrical connection to the connecting wires.

The feed-through of such plugs through the base plate of the spindle motor raises serious difficulties because this feed-through channel must be sealed off in a suitable manner. In doing this it is known to fill the aperture with an (elastic) adhesive, that is to say the connecting plug together with its plug housing is bonded into place in the opening by means of a preferably elastic adhesive. This type of connection, however, suffers from the serious disadvantage that the adhesive used tends to give off foreign gases which get into the protected interior of the spindle motor and may eventually deposit on the storage disks rotating there.

The underlying aim of the invention is, therefore, to extend the sealing of a spindle motor in the region of the connecting pins in such a way that the seal is reliably tight and any evolution of foreign gases is most effectively prevented.

In order to solve the task set the invention is characterised by a support film together with at least one soldering land for soldering the connecting pin and effecting the sealing of the opening in the base plate of the motor.

A characteristic of one embodiment of the invention is that the connecting plug in question is inserted in an opening of the base plate, that connecting pins pass through the insulating body of the connecting plug and terminate in a support film. The connecting pins are soldered by soldering lands on the support film and furthermore the support film seals off the opening in the base plate in that it is arranged on a level, self-contained surface surrounding the opening and is bonded over its entire surface to the latter.

With the stated technical precept the substantial advantage emerges that according to the invention a support film is now used to seal the opening in which support film there is at least one soldering land for soldering the connecting pin or pins on the support film.

Due to the property of the liquid solder to wet the connecting pin and the surface of the soldering land oriented at right angles to it over their entire surfaces in a way which completely envelopes them the melt in the soldering process forms a surface in the shape of a funnel, trumpet or cone which is retained on solidification and reliably and permanently seals the passage of the connecting pin through the support film.

A further characteristic of an embodiment of the invention is that the support film has at least one adhesive layer with which the support film is bonded in sealing manner on the assigned surface of the region surrounding the opening in the base plate.

An important point in this case is that this adhesive layer, which is preferably a PSA layer, does not give off any foreign gases. The abbreviation "PSA" stands for a pressure-sensitive adhesive which under an appropriate contact pressure develops an adhesive force and hence brings about surface bonding of the support film to the base plate in the region surrounding the opening for the connecting plug in the base plate.

Thus, this opening is reliably sealed due on the one hand to the fact that the bore in the support film through which the connecting pin passes is sealed in gas-tight manner by the soldering and on the other hand due to the fact that the support film itself is bonded over its entire area to the corresponding surface of the base plate by means of the previously described adhesive layer in the region surrounding the opening.

Instead of the adhesive layer based on a pressure-sensitive adhesive mentioned here it is also possible to use other bonding methods such as, for example, a double adhesive layer which is connected as a separate part in the manner of a double adhesive tape to the support film.

It is also possible to use contact adhesives but these have to be selected with a view to the requirement that they do not give off foreign gases under the corresponding ambient conditions.

In doing this it is desirable that the support film is arranged in the region of the opening in the base plate in such a way that the free surface of the adhesive layer which may give off foreign gases is arranged to be as far away as possible from this opening in order to minimise the amount of such foreign gases which penetrate into the interior or to prevent this completely.

To this end it is provided for example in a first embodiment that in the case of an inwardly arranged support film the adhesive layer is arranged underneath the support film, ie facing towards the base plate, in order to prevent foreign gases from the adhesive layer on the support layer diffusing into the interior.

Once the housing of the connecting plug also comes to rest in the form of a limit stop on assigned stop surfaces in the base plate in the region of the opening it can be provided in a development of the connection that these limit stop surfaces between the plug housing and the assigned surfaces of the base plate are also additionally bonded and/or sealed.

In all embodiments it is a matter of indifference whether the support film is arranged on the inward surface of the base plate inside the opening or whether the support film is stuck on outside the base plate on the assigned outward facing surface of the base plate.

Accordingly, through the invention all embodiments are claimed, ie both a support film which glues off the opening through the base plate from the inside as well as a support film which closes this opening from the outside.

Of course such sealing support films can also be used from both sides.

In all embodiments the support film assumes a double function since on the one hand the connecting pin passing through the support film is soldered to the associated soldering land, this soldering point sealing the passage hole for the connecting pin by means of the solder used, and on the other hand seals the support film for its part towards the outside by bonding with the corresponding surface of the opening in the base plate.

The subject matter of the present invention emerges not only from the subject matter of the individual patent claims but also from the combination of the single patent claims with one another.

All of the details and characteristics disclosed in the documents including the summary, in particular the spatial construction illustrated in the drawings, are claimed as elements substantiating invention in so far as singly or in combination they are novel with respect to the state of the art.

The invention is explained in more detail below with reference to drawings illustrating just one method of construction. In doing this further characteristics and advantages of the invention substantiating invention emerge from the drawings and their description.

Figure 4:
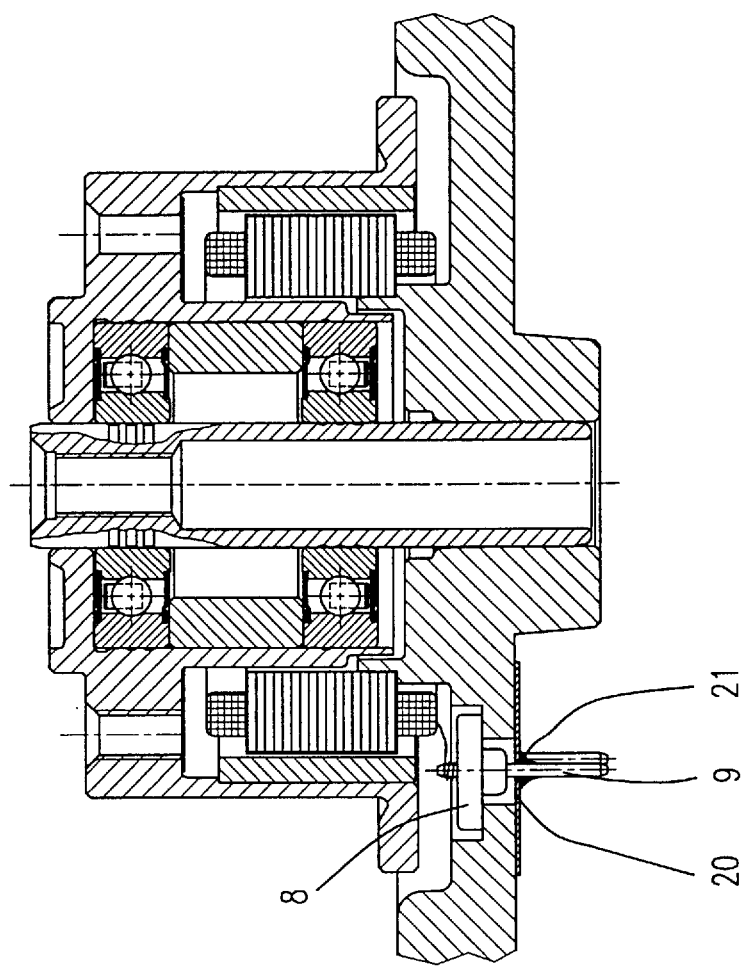
Figure 5:
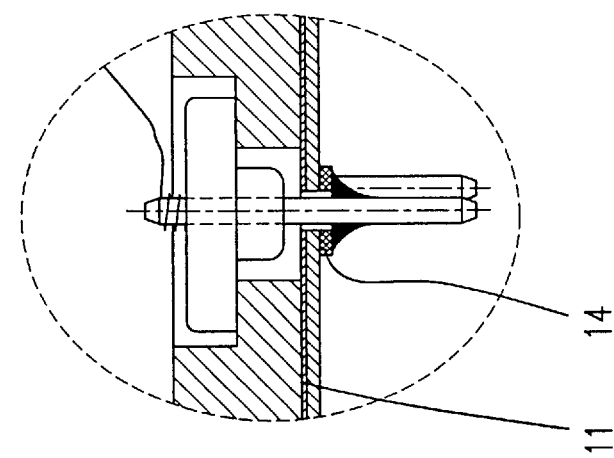
Figure 6:
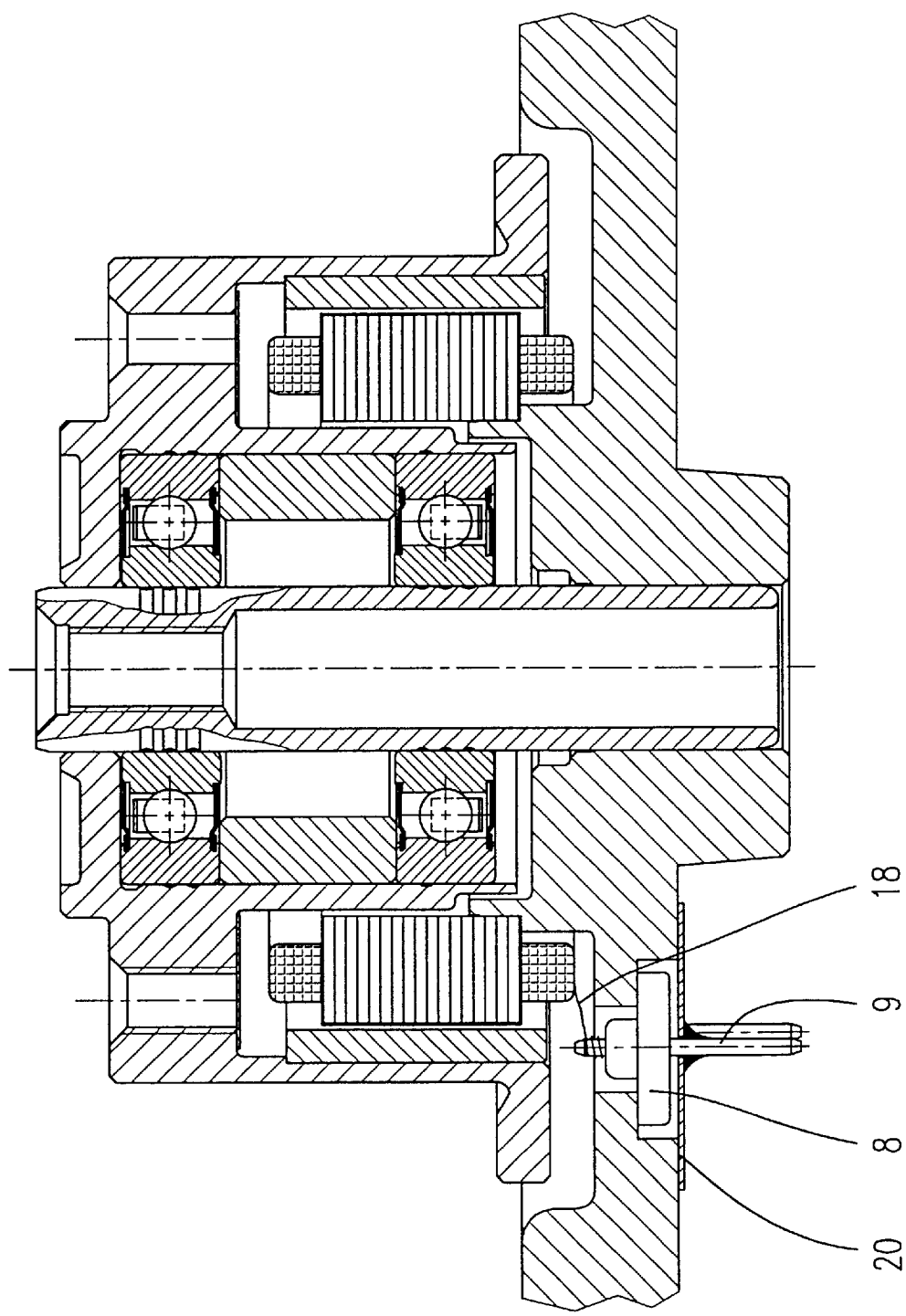
Figure 7:
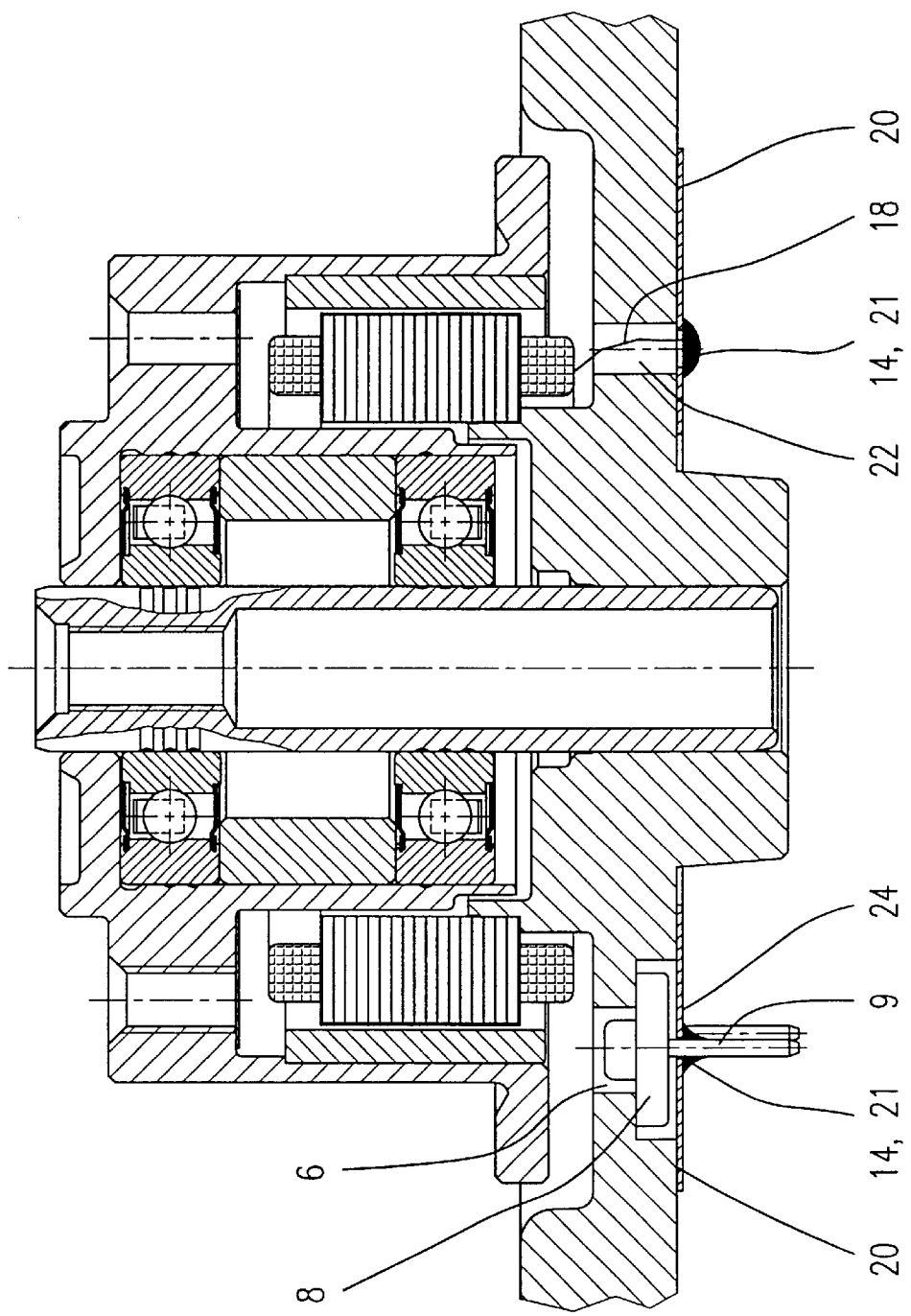

The drawings show:

FIG. 1 a section through a first embodiment of a spindle motor;

FIG. 2 an enlarged view of the connecting region of a connecting pin;

FIG. 3 an embodiment of the connection side of a spindle motor modified with respect to FIG. 1;

FIG. 4 a third embodiment of the connection;

FIG. 5 an enlarged view of the connection region of FIG. 4;

FIG. 6 a fourth embodiment for the connection side;

FIG. 7 a fifth embodiment for the connection side.

According to FIGS. 1 and 2 the spindle motor consists substantially of a base plate 1 in which a fixed shaft 2 is arranged around which a rotor 3 is mounted in rotatable manner by means of corresponding roller bearings.

In this case the rotor is driven via a stator whose windings are soldered via connecting wires 18 to soldering points on the soldering pads 17 which are located on a support film 10.

The soldering pads 17 as part of the support film 10 are electrically connected as shown in FIG. 2 via corresponding strip conductors 12 to the associated soldering lands 13. The making of contact with the strip conductors ensues via at least one connecting plug 7 which in the exemplified embodiment shown in FIG. 1 is arranged in an opening 6 of the base plate 1.

It is now important that the support film 10 makes a sealing closure of the opening 6 relative to the inside of the spindle motor.

The exact sealing is illustrated in FIG. 2. In this case the connecting plug 7 possesses one or more pins 9 which are held in a housing 8.

Each pin passes through a bore 19 in the support film 10 and terminates in an upper soldering point, the bore 19 being sealed by means of solder 21, so that in this way on the one hand an electrically conducting connection is established through the solder 21 between the pin 9 and the soldering land 13 and the strip conductor 12 going off from this and on the other hand a sealing function is achieved at this point between the flexible support film and the connecting pin.

It is now important that an adhesive layer 11 is arranged on the underside of the support film 10 which provides both a sealing surface 16 towards the top in the region with respect to the underside of the support film 10 as well as a downwardly oriented sealing surface 15 which lies on top of assigned surfaces in the region of the opening 6.

Thus, in these regions the opening 6 is sealed absolutely tight with respect to the interior.

Of course still further recesses 4, 5 can be present in the base plate. All that is important is that each connecting plug 7 is sealed as it passes through the opening 6 by the support film 10 described previously.

In FIG. 3 a different arrangement is illustrated in which it may be seen that the plug housing 8 is placed above the base plate on assigned, inwardly oriented limit stop surfaces but that the same seal as shown in FIG. 2 is also present there. In this case the plug can be subjected to tension and is, therefore, secured against tensile loads.

In FIG. 4 it is illustrated as a further form of construction that a support film 20 need not necessarily possess strip conductors for it is sufficient to arrange merely at least one soldering land 14 on this support film, as shown in FIG. 5, which is then sealed by means of the solder 21 so that in this way at least one pin 9 passing through the support film 20 is held sealed in the support film 20.

Here also in the same way shown in FIG. 2 the support film 20 is stuck on in the region of the opening 6 by means of the adhesive layer 11, but in this case from the outside of the base plate. In this case too the complete sealing of the interior in the region of the connecting plug or of the connecting pins is ensured.

In FIG. 6 it is illustrated as a further embodiment that the housing 8 of the plug can also be arranged in a different way in the opening 6 than is shown in FIG. 4, that is to say from the opposite side. It is only important that the support film 20 seals the opening 6 towards the outside it being the case that it fits against the underside of the base plate and its surface area is bonded to the latter. In contrast with this FIGS. 1 to 3 show a support film 10 located on the inside.

In the embodiments shown in FIGS. 4 or 5 and 6 also only single soldering lands are required on the support film 20. Strip conductors are not needed in these cases because, as FIGS. 5 and 6 reveal, the connecting wires 18 are taken directly to the pins 9 of the plug 7 and are soldered directly to these.

As a further embodiment FIG. 7 shows that in the case of an externally located support film 20 such strip conductors 12 can also be present and that still further openings can be sealed off which in this case establish the electric connection from the connecting wires 18 via soldering lands 14 to the pins 9 as is illustrated with reference to the opening 22 on the right-hand side of FIG. 7.

In the opening 22 in this case the connecting wire 18 passes through a corresponding bore in the support film 20 and is electrically connected on the outside of the support film to a strip conductor 12 terminating in a soldering land 14 by a soldered joint, the opening 22 for the connecting wire 18 being again sealed in this case also by the support film bonded to the base plate and solder 21.

Otherwise the support film 20 is stuck on to the outside of the base plate in the region of the opening 6, 22 in exactly the same way shown in FIG. 2 by means of the adhesive layer 11 and in this way reliably seals of the openings 6, 22.

All embodiments have the common feature that the adhesive layer is selected so that it evolves as little gas as possible or gives off no volatile substances which could result in malfunctions in the interior of the spindle motor. The adhesive layer itself preferably consists of a pressure-sensitive, non-curing adhesive. In addition the adhesive layer is arranged in sealing manner in the region of the openings 6, 22 in such a way that the exposed, uncovered portion of the adhesive layer facing into the interior of the spindle motor is small with respect to the total area of the adhesive layer because in this region corresponding installations inhibiting passage such as, for example, the connecting plug 7 or the bore for the passage of the connecting wire 18 in the region of the opening 22 are arranged.

LEGEND TO DRAWINGS

1. Base plate
2. Shaft
3. Rotor cap
4. Recess
5. Recess
6. Opening
7. Connecting plug
8. Housing
9. Pin(s0
10. Support film
11. Adhesive layer 12. Strip conductor
13. Soldering land
14. Soldering land
15. Sealing surface
16. Sealing surface
17. Soldering pad
18. Connecting wire
19. Bore
20. Support film
21. Solder
22. Opening
23.
24. Strip conductor

What is claimed is:

1. A spindle motor comprising:
   a base plate having at least one opening therein;
   a flexible support film adhered in a sealing manner to a surface of said base plate in an area adjacent the opening and extending over the opening;
   at least one connecting pin extending through the base plate opening and through a bore in said support film, said pin being in electrical connection with a coil of said motor; and
   a soldering land on said support film adjacent the support film bore;
   said pin being soldered to said soldering land to thereby electrically connect said pin and soldering land and to seal the bore in said support film, said soldering land and flexible support film sealing said base plate opening.

2. Spindle motor according to claim 1, characterised in that the adhesive layer gives off no foreign gases into the interior of the spindle motor.

3. Spindle motor according to claim 1, characterised in that the support film is arranged in the region of the opening on internally located surfaces of the base plate.

4. Spindle motor according to claim 1, characterised in that the support film is arranged in the region of the opening on externally located surfaces of the base plate.

5. Spindle motor according to claim 1, characterised in that the support film includes an adhesive layer that contains a pressure-sensitive, non-curing adhesive.

6. Spindle motor according to claim 5, characterised in that the adhesive layer is preferably constructed as a PSA layer, that is as a pressure-sensitive adhesive layer which under appropriate contact pressure develops an adhesive force.

7. Spindle motor according to claim 1, characterised in that the support film includes strip conductors.

8. The spindle motor of claim 1 wherein said support film includes at least one adhesive layer adhered to said base plate surface in an area surrounding the base plate opening.

9. The spindle motor of claim 1 wherein said soldering land surrounds the bore in said support film.

10. The spindle motor of claim 1 including: a second opening in said base plate over which said support film extends and a second soldering land on said support film at a location over said second opening, said second land being sealingly soldered closed to thereby seal said second opening.

11. Spindle motor according to claim 10, characterised in that a connecting wire is soldered in sealing manner in the second soldering land.

12. The spindle motor of claim 10 wherein there is no connecting pin present in said second opening.

13. The spindle motor of claim 10 wherein said connecting pin is electrically connected to said second soldering land and said second soldering land is electrically connected to said motor coil.

14. The spindle motor of claim 1 wherein said support film is internally arranged and includes an adhesive layer arranged under the support film and facing toward the base plate in order to prevent diffusion of foreign gases inwardly past the support film into the interior of the spindle motor.

15. The spindle motor of claim 1 including a connecting plug through which said pin extends, said plug including a housing sealingly connected to an adjacent surface of said base plate.

16. The spindle motor of claim 1 wherein said connecting pin is directly connected to said motor coil.

17. The spindle motor of claim 1 wherein said connecting pin is indirectly connected to said motor coil by means of a strip conductor on said support film.

18. The spindle motor of claim 1 wherein said connecting pin is directly connected to said motor coil by means of a wire connected to said connecting pin.

19. The spindle motor of claim 1 including a second soldering land on said support film, wherein said motor coil is electrically connected to said second land and said second land is electrically connected to said soldering land adjacent the support film bore.

20. A spindle motor comprising:
   a base plate having at least one opening therein;
   a flexible support film sealingly adhered to said base plate in a region around the opening;
   at least one connecting pin extending through the base plate opening and through said support film, said pin being in electrical connection with a coil of said motor; and
   a soldering land on said film at a location adjacent said pin, said pin being sealingly soldered to said soldering land;
   said base plate opening being sealed by said flexible support film and the soldering of said pin to said soldering land.

21. The spindle motor of claim 20 including: a second opening in said base plate over which said support film extends and a second soldering land on said support film at a location over said second opening, said second land being sealingly soldered closed to thereby seal said second opening.

22. The spindle motor of claim 21 wherein there is no connecting pin present in said second opening.

23. The spindle motor of claim 22 wherein said connecting pin is electrically connected to said second soldering land and said second soldering land is electrically connected to said motor coil.

24. The spindle motor of claim 20 wherein said connecting pin is directly connected to said motor coil.

25. The spindle motor of claim 20 wherein said connecting pin is indirectly connected to said motor coil by means of a strip conductor on said support film.

26. The spindle motor of claim 20 and including a second soldering land on said support film, wherein said motor coil is electrically connected to said second land and said second land is electrically connected to said at least one soldering land.

27. The spindle motor of claim 20 wherein said soldering land surrounds said connecting pin.

* * * * *